United States Patent
Ishigami et al.

(10) Patent No.: US 6,692,559 B2
(45) Date of Patent: Feb. 17, 2004

(54) PIGMENT YELLOW 74 AND PRINTING INK COMPOSITION

(75) Inventors: Takayoshi Ishigami, Tokyo (JP); Toshio Oshiba, Tokyo (JP); Yoshinori Kawashima, Tokyo (JP); Osamu Shiromaru, Tokyo (JP)

(73) Assignee: Toyo Ink Manufacturing Company, Tokyo (JP)

( * ) Notice: Subject to any disclaimer, the term of this patent is extended or adjusted under 35 U.S.C. 154(b) by 0 days.

(21) Appl. No.: 10/308,006

(22) Filed: Dec. 3, 2002

(65) Prior Publication Data

US 2003/0140819 A1 Jul. 31, 2003

(30) Foreign Application Priority Data

Dec. 3, 2001 (JP) ........................ 2001-368034
Dec. 3, 2001 (JP) ........................ 2001-368035

(51) Int. Cl.$^7$ .................. C09B 29/01; C09B 29/06; C09D 11/02
(52) U.S. Cl. .................. 106/31.8; 106/496; 534/885
(58) Field of Search .................. 106/31.8, 496; 534/885

(56) References Cited

U.S. PATENT DOCUMENTS

| | | | |
|---|---|---|---|
| 4,159,264 A | 6/1979 | Hamilton et al. | 534/584 |
| 4,457,783 A * | 7/1984 | Hamilton et al. | 106/494 |
| 4,496,481 A | 1/1985 | Wheeler | 534/579 |
| 5,024,698 A | 6/1991 | Schwartz et al. | 106/31.8 |
| 6,261,354 B1 | 7/2001 | Vermoortele et al. | 106/31.8 |
| 6,361,595 B1 * | 3/2002 | Smith | 106/499 |

FOREIGN PATENT DOCUMENTS

| | | |
|---|---|---|
| EP | 0 079 303 | 5/1983 |
| EP | 1 054 042 | 11/2000 |
| JP | 10-158555 | 6/1998 |

* cited by examiner

Primary Examiner—Anthony J. Green
(74) Attorney, Agent, or Firm—Wenderoth, Lind & Ponack, LLP

(57) ABSTRACT

A pigment yellow 74 obtained by coupling a coupler component containing 2-methoxyacetoacetoanilide and an acetoacetoanilide derivative of the following formula (1) in an amount of 0.1 to 10 mol %, based on the 2-methoxyacetoacetoanilide, and a diazo component obtained by diazotizing 2-methoxy-4-nitroaniline,

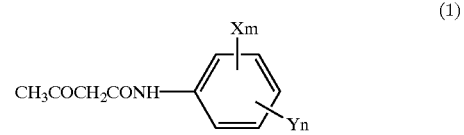

(1)

wherein X may be the same or different and is $CONR_1R_2$, $SO_2NR_1R_2$, $NHCOR_1$, $CONH(CH_2)_kNR_1R_2$ or $SO_2NH(CH_2)_kNR_1R_2$ (in which each of $R_1$ and $R_2$ is independently a hydrogen atom or an alkyl group, or $R_1$ and $R_2$ together form a cyclic structure, and k is an integer of 1 to 4), m is 1 or 2, Y maybe the same or different and is $R_3$, $OR_3$ (in which $R_3$ is a hydrogen atom or an alkyl group), COOH or $SO_3H$, and n is an integer of 0 to 2, and a printing ink composition comprising the above pigment yellow 74.

5 Claims, No Drawings

PIGMENT YELLOW 74 AND PRINTING INK COMPOSITION

FIELD OF THE INVENTION

The present invention relates to a pigment yellow 74 and a printing ink composition using it. More specifically, it relates to a pigment yellow 74 improved in color strength and transparency and a printing ink composition using it.

BACKGROUND OF THE INVENTION

Conventionally, as a yellow pigment for a printing ink, there has been used a disazo yellow pigment using 3,3'-dichlorobenzidine as a tetrazo component and an acetoacetoanilide compound as a coupling component. However, since the disazo yellow pigment has a biphenyl skeleton in its structure and contains chlorine, there is an apprehension of the generation of a toxic material at the time of disposing of a printed matter.

For this reason, it is strongly required to develop a yellow pigment which has pigment performance equivalent to that of the disazo yellow pigment and is producible at a low production cost and excellent in hygiene. Pigment yellow 74 using 2-methoxy-4-nitroaniline as a diazo component and 2-methoxyacetoacetoanilide as a coupling component has advantages of excellent light resistance and clearness but has disadvantages of extremely poor transparency and color strength.

For improving the transparency and color strength of the pigment yellow 74, a surface-treatment technique is conventionally adopted. This technique is a method in which a rosin alkali salt solution (so-called rosin soap) is added into a coupler component or into a pigment slurry after coupling and then a metal salt for a lake such as aluminium sulfate is added to deposit the rosin, as an insoluble rosin lake metal salt, on a pigment surface, whereby a pigment particle shape is finely controlled. However, this technique is not sufficient.

Under the present situation, for the above reason, the pigment yellow 74 is only partially used for a building material coating composition, etc., which is required to have hiding power, and its applications to a printing ink which is required to have higher transparency and color strength have been hardly developed.

SUMMARY OF THE INVENTION

It is an object of the present invention to provide a pigment yellow 74 which is improved in transparency and color strength without impairing its inherent light resistance and clearness.

According to the present invention, there is provided a pigment yellow 74 obtained by coupling a coupler component containing 2-methoxyacetoacetoanilide and an acetoacetoanilide derivative of the following formula (1) in an amount of 0.1 to 10 mol %, based on the 2-methoxyacetoacetoanilide, and a diazo component obtained by diazotizing 2-methoxy-4-nitroaniline,

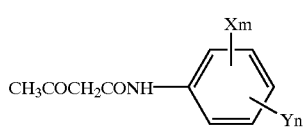

(1)

wherein X may be the same or different and is $CONR_1R_2$, $SO_2NR_1R_2$, $NHCOR_1$, $CONH(CH_2)_KNR_1R_2$ or $SO_2NH(CH_2)_KNR_1R_2$ (in which each of $R_1$ and $R_2$ is independently a hydrogen atom or an alkyl group, or $R_1$ and $R_2$ together form a cyclic structure, and k is an integer of 1 to 4), m is 1 or 2, Y may be the same or different and is $R_3$, $OR_3$ (in which $R_3$ is a hydrogen atom or an alkyl group), COOH or $SO_3H$, and n is an integer of 0 to 2.

According to the present invention, further, there is provided a pigment yellow 74 according to the above, wherein the diazo component is obtained by diazotizing the 2-methoxy-4-nitroaniline and an aniline derivative of the following formula (2) in an amount of 0.1 to 10 mol % based on the 2-methoxy-4-nitroaniline,

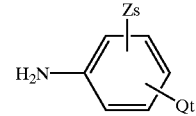

(2)

in which Z may be the same or different and is $CONR_1R_2$, $SO_2NR_1R_2$, $CONH(CH_2)_KNR_1R_2$, $SO_2NH(CH_2)_KNR_1R_2$, COOH or $SO_3H$ (in which each of $R_1$ and $R_2$ is independently a hydrogen atom or an alkyl group, or $R_1$ and $R_2$ together form a cyclic structure, and k is an integer of 1 to 4), s is an integer of 1 or 2, Q may be the same or different and is $R_3$, $OR_3$ or $NO_2$ (in which $R_3$ is a hydrogen atom or an alkyl group), and t is an integer of 0 to 2.

According to the present invention, further, there is provided a pigment yellow 74 obtained by coupling a coupler component containing 2-methoxyacetoacetoanilide with a diazo component obtained by diazotizing 2-methoxy-4-nitroaniline and an aniline derivative of the formula (2) in an amount of 0.1 to 10 mol % based on the 2-methoxy-4-nitroaniline,

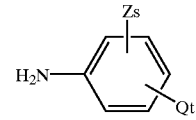

(2)

wherein Z may be the same or different and is $CONR_1R_2$, $SO_2NR_1R_2$, $CONH(CH_2)_KNR_1R_2$, $SO_2NH(CH_2)_KNR_1R_2$, COOH or $SO_3H$ (in which each of $R_1$ and $R_2$ is independently a hydrogen atom or an alkyl group, or $R_1$ and $R_2$ together form a cyclic structure, and k is an integer of 1 to 4), s is an integer of 1 or 2, Q may be the same or different and is $R_3$, $OR_3$ or $NO_2$ (in which $R_3$ is a hydrogen atom or an alkyl group), and t is an integer of 0 to 2.

According to the present invention, further, there is provided a printing ink composition comprising the pigment yellow 74 recited the above and a vehicle for a printing ink.

DETAILED DESCRIPTION OF THE INVENTION

In the present invention, $R_1$ and $R_2$ in an acetoacetoanilide derivative of the formula (1) and an aniline derivative of the formula (2) are each a hydrogen atom or an alkyl group. As the alkyl group, preferred is an alkyl group having 1 to 18 carbon atoms, and an alkyl group having 1 to 4 carbon atoms is more preferred. Further, as a cyclic structure obtained by bonding of $R_1$ and $R_2$, there is a five-membered ring or a six-membered ring. The above cyclic structure may further contain a nitrogen atom or an oxygen atom as a constituent component.

Examples of an amine residue represented by —NR$_1$R$_2$ in the formula (1) and the formula (2) include a methylamino group, an ethylamino group, a stearylamino group, a dimethylamino group, a diethylamino group, a methylaminopropylamino group, a dimethylaminopropylamino group, a diethylaminopropylamino group and a N-aminoethyl-4-pipecolinyl group, while the amine residue shall not be limited to these examples.

Further, R$_3$ in the formula (1) is a hydrogen atom or an alkyl group. As the alkyl group, an alkyl group having 1 to 4 carbon atoms is preferred.

Further, examples of an aniline derivative having a carboxyl group or a sulfonic group include 4-methoxyaniline-2-sulfonic acid, 2,5-dimethoxyaniline-4-sulfonic acid, 2-nitroaniline-4-sulfonic acid and 2-chloro-4-sulfo-5-aminobenzoic acid.

The pigment yellow 74 of the present invention can be produced according to a conventionally-known method. That is, 2-methoxy-4-nitroaniline is diazotized to prepare a diazonium component, on the other hand, the acetoacetoanilide derivative of the formula (1) in an amount of 0.1 to 10 mol %, preferably 1 to 5 mol %, based on 2-methoxyacetoacetoanilide, is added to 2-methoxyacetoacetoanilide to prepare a coupling component, and the diazonium component and the coupling component are coupled according to a general method.

Further, when the aniline derivative of the formula (2) is used as a diazo component, the aniline derivative in an amount of 0.1 to 10 mol %, preferably 1 to 5 mol %, based on 2-methoxy-4-nitroaniline, is added to 2-methoxy-4-nitroaniline, then the resultant mixture is diazotized and coupling is similarly carried out. The coupling reaction is not specially limited, and it may be a batch method carried out under an acidic condition of acetic acid, which is usually called an acid dipping method, or a continuous method in which a diazo solution and a coupling solution are simultaneously added in equal reaction amounts.

The pigment yellow 74 of the present invention in the state of a wet cake is flushed with a vehicle for a printing ink to prepare a printing ink. Otherwise, a powdery pigment of the pigment yellow 74 is kneaded with a vehicle for a printing ink to prepare a printing ink. The pigment for the flushing can be obtained as a wet cake by filtrating and washing a slurry after coupling and compressing it such that a pigment content becomes 26 to 32% by weight. The powdery pigment can be obtained by drying the wet cake and pulverizing the dried wet cake.

When an offset printing ink is produced by using the pigment yellow 74 of the present invention, flushing is carried out with a flusher and, in this case, 180 to 220 parts by weight of an offset printing ink vehicle is added to 100 parts by weight of the wet cake as a dry pigment. The preparation of an ink from the powdery pigment is carried out with a three-roll mill and, in this case, 350 to 450 parts by weight of a vehicle for an offset printing ink is added to 100 parts by weight of the powdery pigment.

The pigment yellow 74 of the present invention can be used as a yellow pigment for an offset printing ink for process ink. An offset printing ink composition is composed of 3 to 35% by weight of the pigment yellow 74 of the present invention, 97 to 45% by weight of a vehicle for an offset printing ink and 0 to 20% by weight of other auxiliary agents (a dryer, a leveling-improving agent or a thickening agent) or an extender pigment. The vehicle for an offset printing ink is generally composed of 20 to 50% by weight of a resin, 0 to 30% by weight of a vegetable oil and 10 to 60% by weight of a solvent. Examples of the resin include a rosin-modified phenol resin, a petroleum resin, an alkyd resin or drying-oil-modified resins of these. Examples of the vegetable oil include linseed oil, tung oil and soybean oil. Examples of the solvent include n-paraffin, isoparaffin, aromatic, naphthene and α-olefin. Further, various known additives for an ink, such as a dryer or a leveling-improving agent, are incorporated to prepare the printing ink composition.

The pigment yellow 74 of the present invention can be used as a yellow pigment for a gravure printing ink for a process ink. A vehicle for a gravure printing ink is generally composed of 10 to 50% by weight of a resin and 30 to 80% by weight of a solvent. Examples of the resin include a gum rosin, a wood rosin, a tall oil rosin, a lime rosin, a rosin ester, a maleic resin, a polyamide resin, a vinyl resin, cellulose nitrate, cellulose acetate, ethyl cellulose, chlorinated rubber, cyclized rubber, an ethylene-vinyl acetate copolymer resin, a polyurethane resin, a polyester resin, an alkyd resin, an acrylic resin, gilsonite, dammar, shellac, mixtures of these, water-soluble resins obtained by rendering any one of the above resins or a mixture of these water-soluble, or an emulsion resin. Examples of the solvent include hydrocarbon, alcohol, ketone, ether alcohol, ether, ester and water.

The pigment yellow 74 of the present invention can be used as a yellow pigment for a color-electrophotographic toner, for water-based and oil-based inkjet recording liquids, and for a resist ink which is used for a color filter for a liquid crystal display and contains a photosensitive resin as a main component.

EFFECT OF THE INVENTION

According to the present invention, there is provided a pigment yellow 74 which is improved in transparency and color strength without impairing its inherent light resistance and clearness.

The present invention will be explained with reference to Examples in detail hereinafter, in which "part" stands for "part by weight" and "%" stands for "% by weight" unless otherwise specified.

EXAMPLE 1

168 parts of 2-methoxy-4-nitroanilline was dissolved in a solvent containing 2,000 parts of water and 260 parts of 35% hydrochloric acid to obtain a solution, and 1,000 parts of ice was added to the solution to cool it to 0°0 C. A solution containing 200 parts of water and 70 parts of sodium nitrite was added to the cooled solution, and the resultant mixture was stirred at 3° C. or lower for 60 minutes, to obtain a diazo component. On the other hand, 200 parts of 2-methoxyacetoacetoanilide and 8 parts of a compound of the following formula (3) were dissolved in a solution containing 5,000 parts of water and 100 parts of sodium hydroxide. 200 parts of 80% acetic acid was gradually added to the resultant solution to prepare a suspension as a coupler component. The diazo component was added to the coupler component over 60 minutes, to obtain a pigment slurry. The reaction temperature was kept at approximately 20° C. The pH of the pigment slurry was adjusted to 9.5 to 10.0 with sodium hydroxide, and then 70 parts of a 25% rosin soap was added to the slurry. The resultant slurry was stirred for 10 minutes and then hydrochloric acid was added to adjust its pH to 5.0 and to deposit the rosin on a pigment surface. Then, filtration, washing with water and compressing were carried out to obtain a wet cake having a pigment content of 27.5%. Further, part of the wet cake was dried and pulverized to obtain a pigment powder.

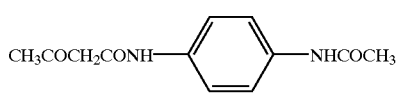

(3)

An ink was prepared by flushing with a flusher having a volume of 1 liter. In this preparation, 100 parts, as a dry weight, of the above wet cake and 190 parts of an ink vehicle for offset which had been heated up to 100° C. were simultaneously poured into the flusher and flushing was carried out. Then, water generated by the flushing was removed and then heating was carried out for 30 minutes under a reduced pressure (1~8×10$^3$ Pa) until the internal temperature of a kneaded mixture reached to 100° C., thereby completely removing water of the kneaded mixture. 280 parts of an ink vehicle for offset and 50 parts of a solvent were gradually added to the kneaded mixture and then the resultant mixture was taken out from the flusher. Then, the mixture was kneaded with a three-roll mill at a roll temperature of 60° C. under a pressure of 10 Barr, and coarse particles were removed to obtain abase ink. 25 parts of an ink vehicle for offset, 10 parts of a solvent and 3 parts of an auxiliary agent were added to 62 parts of the base ink to adjust tackiness to 5.8 to 6.0, whereby an ink as an end product was obtained.

In the case of the pigment powder, 100 parts of the pigment was added to 400 parts of an ink vehicle for offset and dispersing was carried out using a three-roll mill to obtain abase ink. An ink vehicle for offset, a solvent and an auxiliary agent were added to the base ink to adjust tackiness to 5.8 to 6.0, whereby an ink as an end product was obtained.

EXAMPLE 2

A wet cake having a pigment content of 27.0% and a pigment powder were obtained in the same manners as in Example 1 except that 168 parts of 2-methoxy-4-nitroaniline was used to prepare a diazo component and that 200 parts of 2-methoxyacetoacetoanilide and 11 parts of a compound of the following formula (4) were used to prepare a coupler component.

Inks as an end product were prepared in the same manners as in Example 1.

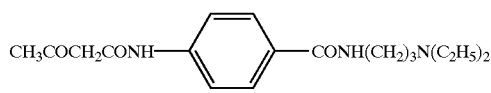

(4)

EXAMPLE 3

A wet cake having a pigment content of 27.5% and a pigment powder were obtained in the same manners as in Example 1 except that 168 parts of 2-methoxy-4-nitroaniline was used to prepare a diazo component and that 200 parts of 2-methoxyacetoacetoanilide and 11 parts of a compound of the following formula (5) were used to prepare a coupler component.

Inks as an end product were prepared in the same manners as in Example 1.

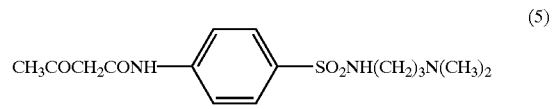

(5)

EXAMPLE 4

A wet cake having a pigment content of 27.0% and a pigment powder were obtained in the same manners as in Example 1 except that 165 parts of 2-methoxy-4-nitroaniline and 4 parts of 2-nitroaniline-4-sulfonic acid were used to prepare a diazo component and that 200 parts of 2-methoxyacetoacetoanilide and 11 parts of a compound of the above formula (5) were used to prepare a coupler component.

Inks as an end product were prepared in the same manners as in Example 1.

EXAMPLE 5

A wet cake having a pigment content of 27.0% and a pigment powder were obtained in the same manners as in Example 1 except that 164 parts of 2-methoxy-4-nitroaniline and 9 parts of a compound of the following formula (6) were used to prepare a diazo component and that 200 parts of 2-methoxyacetoacetoanilide and 11 parts of a compound of the above formula (5) were used to prepare a coupler component.

Inks as an end product were prepared in the same manners as in Example 1.

(6)

EXAMPLE 6

165 parts of 2-methoxy-4-nitroaniline and 4 parts of 2-nitroaniline-4-sulfonic acid were dissolved in a solution containing 2,000 parts of water and 260 parts of 35% hydrochloric acid to obtain a solution, and 1,000 parts of ice was added to the solution to cool it to 0° C. A solution containing 200 parts of water and 70 parts of sodium nitrite was added to the cooled solution and the resultant mixture was stirred at 3° C. or lower for 60 minutes, to obtain a diazo component. On the other hand, 207 parts of 2-methoxyacetoacetoanilide was dissolved in a solution containing 5,000 parts of water and 100 parts of sodium hydroxide. 200 parts of 80% acetic acid was gradually added to the resultant solution to prepare a suspension as a coupler component. The diazo component was added to the coupler component over 60 minutes, to obtain a pigment slurry. The reaction temperature was kept at approximately 20° C. The pH of the pigment slurry was adjusted to 9.5 to 10.0 with sodium hydroxide, and then 70 parts of a 25% rosin soap was added to the slurry. The resultant slurry was stirred for 10 minutes and then hydrochloric acid was added to adjust its pH to 5.0 and to deposit the rosin on a pigment surface. Then, filtration, washing with water and compressing were carried out to obtain a wet cake having a pigment content of 27.5%. Further, part of the wet cake was dried and pulverized to obtain a pigment powder.

Inks as an end product were prepared in the same manners as in Example 1.

EXAMPLE 7

A wet cake having a pigment content of 27.0% and a pigment powder were obtained in the same manners as in Example 6 except that 164 parts of 2-methoxy-4-nitroaniline and 9 parts of a compound of the above formula (6) were used to prepare a diazo component and that 207 parts of 2-methoxyacetoacetoanilide was used to prepare a coupler component.

Inks as an end product were prepared in the same manners as in Example 1.

EXAMPLE 8

A wet cake having a pigment content of 26.7% and a pigment powder were obtained in the same manners as in Example 6 except that 164 parts of 2-methoxy-4-nitroaniline and 5 parts of 5-aminosalicylic acid were used to prepare a diazo component and that 207 parts of 2-methoxyacetoacetoanilide was used to prepare a coupler component.

Inks as an end product were prepared in the same manners as in Example 1.

COMPARATIVE EXAMPLE 1

A wet cake having a pigment content of 27.3% and a pigment powder were obtained in the same manners as in Example 1 except that 168 parts of 2-methoxy-4-nitroaniline was used to prepare a diazo component and that 207 parts of 2-methoxyacetoacetoanilide was used to prepare a coupler component.

Inks as an end product were prepared in the same manners as in Example 1.

Table 1 shows results from the wet cakes and the pigment powders.

Transparency: An end product ink was interposed with two transparent film sheets and then a sample was prepared so as to have a thickness of 1 mm. The sample was measured for a L* value with a color machine and the L* value was used as an index of transparency. Transparency increases with decreasing the L* value.

Color strength: Printing using an end product ink was carried out on a coat paper with a printing machine to form a printing of $3.0 \times 10\text{-}2$ g/cm$^3$. Color strength increases with increasing a Gretag value. Color strength was measured with a reflectivity densitometer.

TABLE 1

|  | Wet cake | | Pigment powder | |
| --- | --- | --- | --- | --- |
|  | Transparency | Color strength, | Transparency | Color strength |
| Example 1 | 75.7 | 2.10 | 78.0 | 1.57 |
| Example 2 | 66.3 | 2.11 | 76.5 | 1.69 |
| Example 3 | 67.1 | 2.12 | 76.7 | 1.72 |
| Example 4 | 66.8 | 2.10 | 75.3 | 1.74 |
| Example 5 | 66.3 | 2.11 | 75.0 | 1.76 |
| Example 6 | 76.1 | 1.98 | 77.0 | 1.68 |
| Example 7 | 69.6 | 2.08 | 77.5 | 1.72 |
| Example 8 | 77.5 | 1.96 | 78.1 | 1.65 |
| Comparative Example 1 | 84.7 | 1.50 | 85.1 | 1.38 |

What is claimed is:

1. A pigment yellow 74 obtained by coupling a coupler component containing 2-methoxyacetoacetoanilide and an acetoacetoanilide derivative of the following formula (1) in an amount of 0.1 to 10 mol %, based on the 2-methoxyacetoacetoanilide, and a diazo component obtained by diazotizing 2-methoxy-4-nitroaniline,

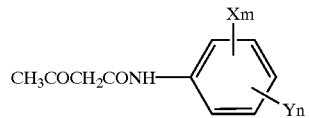

(1)

wherein X may be the same or different and is $CONR_1R_2$, $SO_2NR_1R_2$, $NHCOR_1$, $CONH(CH_2)_KNR_1R_2$ or $SO_2NH(CH_2)_KNR_1R_2$ (in which each of $R_1$ and $R_2$ is independently a hydrogen atom or an alkyl group, or $R_1$ and $R_2$ together form a cyclic structure, and k is an integer of 1 to 4), m is 1 or 2, Y maybe the same or different and is $R_3$, $OR_3$ (in which $R_3$ is a hydrogen atom or an alkyl group), COOH or $SO_3H$, and n is an integer of 0 to 2.

2. A pigment yellow 74 according to claim 1, wherein the diazo component is obtained by diazotizing the 2-methoxy-4-nitroaniline and an aniline derivative of the following formula (2) in an amount of 0.1 to 10 mol % based on the 2-methoxy-4-nitroaniline,

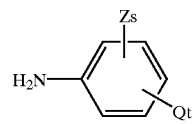

(2)

wherein Z may be the same or different and is $CONR_1R_2$, $SO_2NR_1R_2$, $CONH(CH_2)_KNR_1R_2$, $SO_2NH(CH_2)_KNR_1R_2$, COOH or $SO_3H$ (in which each of $R_1$ and $R_2$ is independently a hydrogen atom or an alkyl group, or $R_1$ and $R_2$ together form a cyclic structure, and k is an integer of 1 to 4), s is an integer of 1 or 2, Q may be the same or different and is $R_3$, $OR_3$ or $NO_2$ (in which $R_3$ is a hydrogen atom or an alkyl group), and t is an integer of 0 to 2.

3. A printing ink composition comprising the pigment yellow 74 recited in claim 1 and a vehicle for a printing ink.

4. A pigment yellow 74 obtained by coupling a coupler component containing 2-methoxyacetoacetoanilide with a diazo component obtained by diazotizing 2-methoxy-4-nitroaniline and an aniline derivative of the formula (2) in an amount of 0.1 to 10 mol % based on the 2-methoxy-4-nitroaniline,

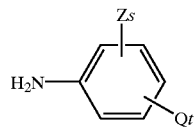

(2)

wherein Z may be the same or different and is $CONR_1R_2$, $SO_2NR_1R_2$, $CONH(CH_2)_KNR_1R_2$, $SO_2NH(CH_2)_KNR_1R_2$, COOH or $SO_3H$ (in which each of $R_1$ and $R_2$ is independently a hydrogen atom or an alkyl group, or $R_1$ and $R_2$ together form a cyclic structure, and k is an integer of 1 to 4), s is an integer of 1 or 2, Q may be the same or different and is $R_3$, $OR_3$ or $NO_2$ (in which $R_3$ is a hydrogen atom or an alkyl group), and t is an integer of 0 to 2.

5. A printing ink composition comprising the pigment yellow 74 recited in claim 4 and a vehicle for a printing ink.

* * * * *